United States Patent
Wasas

(10) Patent No.: US 12,427,469 B2
(45) Date of Patent: *Sep. 30, 2025

(54) FILTER, COMPOSITION AND PROCESS FOR CLEANING FEED AND EXHAUST FLUIDS AND METHOD FOR ELIMINATING PFAS AND OTHER NOXIOUS IMPURITIES IN FLUIDS

(71) Applicant: Standard H2, Inc., Ravenna, OH (US)

(72) Inventor: Mariavicenta Wasas, Aurora, OH (US)

(73) Assignee: Standard H2, Inc., Ravenna, OH (US)

( * ) Notice: Subject to any disclaimer, the term of this patent is extended or adjusted under 35 U.S.C. 154(b) by 572 days.

This patent is subject to a terminal disclaimer.

(21) Appl. No.: 17/951,806

(22) Filed: Sep. 23, 2022

(65) Prior Publication Data
US 2023/0116353 A1  Apr. 13, 2023

Related U.S. Application Data

(63) Continuation-in-part of application No. 17/676,443, filed on Feb. 21, 2022, now Pat. No. 11,499,455.
(Continued)

(51) Int. Cl.
*B01D 53/04* (2006.01)
*B01J 20/02* (2006.01)
(Continued)

(52) U.S. Cl.
CPC ..... *B01D 53/0407* (2013.01); *B01D 53/0438* (2013.01); *B01D 53/0454* (2013.01); *B01J 20/0203* (2013.01); *B01J 20/041* (2013.01); *B01J 20/08* (2013.01); *B01J 20/103* (2013.01); *B01J 20/28004* (2013.01); *B01J 20/28016* (2013.01); *B01D 2253/104* (2013.01); *B01D 2253/106* (2013.01); *B01D 2253/1122* (2013.01); *B01D 2253/1124* (2013.01); *B01D 2253/304* (2013.01); *B01D 2256/16* (2013.01); *B01D 2256/245* (2013.01); *B01D 2257/2027* (2013.01); *B01D 2257/304* (2013.01); *B01D 2257/306* (2013.01); *B01D 2257/404* (2013.01);
(Continued)

(58) Field of Classification Search
None
See application file for complete search history.

(56) References Cited

U.S. PATENT DOCUMENTS

| 4,220,633 A | 9/1980 | Pirsh |
| 2004/0079060 A1 | 4/2004 | Alward |

(Continued)

FOREIGN PATENT DOCUMENTS

GB  808806 A  2/1959

OTHER PUBLICATIONS

International Search Report and Written Opinion of the ISA for corresponding application PCT/US22/37248 dated Sep. 7, 2022.

*Primary Examiner* — Jelitza M Perez
(74) *Attorney, Agent, or Firm* — William G Mitchell

(57) ABSTRACT

A fluid filter, filtering medium composition, and associated process for removing contaminants from feed and exhaust fluids used in fuel cell electricity generation, laboratories, the semiconductor and other industries to improve performance and extend useful equipment lifetimes and to clean fluids of sulfur compound contaminants, as well as to remove noxious NOx and halogen contaminants from feed and exhaust gases.

16 Claims, 2 Drawing Sheets

Related U.S. Application Data

(60) Provisional application No. 63/226,077, filed on Jul. 27, 2021.

(51) Int. Cl.
*B01J 20/04* (2006.01)
*B01J 20/08* (2006.01)
*B01J 20/10* (2006.01)
*B01J 20/28* (2006.01)

(52) U.S. Cl.
CPC ............... *B01D 2259/4533* (2013.01); *B01D 2259/4541* (2013.01)

(56) References Cited

U.S. PATENT DOCUMENTS

| | | |
|---|---|---|
| 2008/0202107 A1 | 8/2008 | Boorse et al. |
| 2009/0131243 A1 | 5/2009 | Wittrock et al. |
| 2014/0271451 A1 | 9/2014 | Buccini |
| 2015/0224482 A1* | 8/2015 | Cizeron ............... B01J 23/76 502/263 |
| 2016/0136567 A1 | 5/2016 | Buccini |

* cited by examiner

FILTER, COMPOSITION AND PROCESS FOR CLEANING FEED AND EXHAUST FLUIDS AND METHOD FOR ELIMINATING PFAS AND OTHER NOXIOUS IMPURITIES IN FLUIDS

CROSS REFERENCE TO RELATED APPLICATIONS

This application claims priority to U.S. patent application Ser. No. 17/676,443, filed on Feb. 21, 2022, and thereby to provisional patent application 63/226,077, filed on Jul. 27, 2021, each incorporated herein by reference.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a filter composition and associated method for purifying feed gases and liquids used for fuel cells, laboratories, the semiconductor, and other industries to improve performance and extend useful equipment lifetimes, as well as eliminating sulfur compounds from other fluids, and to remove noxious contaminants from exhaust gases and liquids. Hydrogen sulfide (H2S), sulfur containing hydrocarbons known as mercaptans or thiols, sulfur containing compounds such as carbonyl sulfide, carbon disulfide, and so on, as well as Per- and Polyfluorinated substances (PFAS), including Perfluorooctane sulfonate (PFOS) and Perfluorooctanoic acid (PFOA), are the most common, and most difficult to remove, of the contaminants that poison the catalysts used in fuel cells to generate electricity, the catalysts and chemicals used in laboratory and industrial applications such as petroleum refining, the semiconductor industry, and many others.

Background of the Invention

Sulfur containing contaminants in concentrations of even parts per billion can cause failure of equipment that should last many years in just a few years or, in extreme cases, in months. Inexpensive filter agents, such as activated carbon and common metal oxides, can lower the concentration of these sulfur containing contaminants, but cannot remove them to the extremely low levels required for optimal performance and lifespan in these specialized industries. "Sour gas" is known as natural gas or any other gas containing significant amounts of $H_2S$ or other sulfur containing compounds that can be damaging to pipelines, equipment, and be unpleasant to smell. Before a raw natural gas containing sour contaminants can be used, the raw gas must be treated to remove those impurities down to acceptable levels commonly by an amine treatment process conducted within oil and natural gas refineries. The removal of hydrogen sulfide and other organosulfur compounds is referred to as "sweetening". The sweetened products lacks the sour, foul odors of the organosulfur compounds, but this "sweetened" product is not completely free of organosulfur compounds.

Per- and Polyfluorinated substances (PFAS), including Perfluorooctane sulfonate (PFOS) and Perfluorooctanoic acid (PFOA), are contaminants believed to cause multiple adverse health effects in humans, including increased cancer risk, decreased fertility, interference with the immune and endocrine systems and childhood development. Energy companies are known to have used PFAS and/or substances that can degrade into PFAS in hydraulic fracturing ("fracking") in hundreds of U.S. wells. The presence of PFAS in industrial fluids can lead to contamination of adjacent water sources. Known industrial and commercial filters such as activated carbon do not reliably remove PFAS, which requires reverse osmosis to be removed from water. PFAS are known as "forever chemicals" that do not break down due to fluorine's electronegativity and chemical stability.

The use of absorbents and adsorbents consisting of oxides of metallic elements to remove sulfur from sour gas is known. See, e.g., U.S. Pat. No. 5,853,681 to Denny et al. and U.S. Pat. No. 8,596,407 to Hatscher.

What is needed is a simple, efficient and cost-effective method of removing hydrogen sulfide, organosulfur, chlorine and other halogens, nitrous oxides, PFAS, and other contaminants to very low levels from fluid streams intended for use in fuel cells, other sulfur and contaminant sensitive industrial and laboratory applications, inorganic liquids and various organic liquids.

BRIEF SUMMARY OF THE INVENTION

In a preferred embodiment, a fluid filter for attachment to a gas or liquid line, such fluid filter comprising a housing packed with a filtering medium composition of granular particles ranging in size from about 15 mm to about 0.001 mm and consisting of a homogeneous composition of oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium, further comprising elemental gold, palladium, and platinum collectively comprising between 0.000001% and 0.002% of the filtering medium.

In another preferred embodiment, the fluid filter as described herein, further comprising an input line, wherein the housing has a diameter three or more times larger than the input line diameter.

In another preferred embodiment, the fluid filter as described herein, wherein the housing is three or more times longer than its own diameter.

In another preferred embodiment, the fluid filter as described herein, wherein the granular particles range in size from 4 mm to 0.04 mm.

In another preferred embodiment, the fluid filter as described herein, wherein the filter medium composition is at least 80% oxides of copper as determined by ICP-MS solution analysis of nitric acid digestions of the medium.

In another preferred embodiment, the fluid filter as described herein, wherein the filtering medium is comprised of at least 90% by total weight oxides of copper.

In another preferred embodiment, the fluid filter as described herein, further comprising a contact temperature range from ambient temperature up to 500 C.

In another preferred embodiment, the fluid filter as described herein, wherein the contact temperature ranges from 30 C to 300 C.

In another preferred embodiment, the fluid filter as described herein, wherein the composition of the filtering medium composition is recyclable or regenerable.

In another preferred embodiment, a filtering medium composition of granular particles ranging in size from about 15 mm down to about 0.001 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium plus elemental gold, palladium, and platinum, wherein percentages of components are given by total weight and: oxides of copper comprise at least 80% of the filtering medium, non-copper oxides comprise between 0.001% and 19.9999% of the filtering medium, and elemental gold, palladium and platinum comprise between 0.000001% and 0.002% of the filtering medium.

In another preferred embodiment, the filtering medium as described herein, wherein: oxides of copper comprise up to 90% of the filtering medium, non-copper oxides comprise between 0.001% and 9.9999% of the filtering medium, and elemental gold, palladium and platinum comprise between 0.00001% and 0.0001% of the filtering medium.

In another preferred embodiment, a process for removing hydrogen sulfide, sulfur containing compounds such as thiols or mercaptans, oxides of nitrogen, PFAS substances and halogens from a gas or liquid stream that lowers the concentration of these contaminants to levels that are below the limit of detection of standard laboratory instrumentation by passing the gas or liquid stream through a fluid filter, such filter comprising a filter housing with a contact temperature ranging from about ambient to about 500C that is packed with filtering medium composition of granular particles ranging in size from about 15 mm down to about 0.01 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium, further comprising elemental gold, palladium, and platinum collectively comprising between 0.000001% and 0.002% of the filtering medium.

In another preferred embodiment, the process as described herein, wherein the stream flows upward through the filter.

In another preferred embodiment, the process as described herein, wherein the fluid filter is the fluid filter previously described herein.

In another preferred embodiment, the process as described herein, wherein the filtering medium is the filtering medium previously described herein.

In another preferred embodiment, the process as described herein, wherein the stream is comprised of hydrogen, natural gas, biogas, or other laboratory or industrial gases or mixture of gases comprising air and specialty high purity composite gases of the grade known as "Chemically Pure" or "Research" that are bottled gases typically available to laboratory and industrial customers, in pipelines, in exhaust streams, or of liquids such as organic or inorganic liquids.

In another preferred embodiment, the process as described herein, wherein hydrogen sulfide, thiols, mercaptans, other sulfur containing molecules, oxides of nitrogen, PFAS substances and halogens are removed from feed or exhaust fluids.

DETAILED DESCRIPTION OF THE INVENTION

Figure 1:
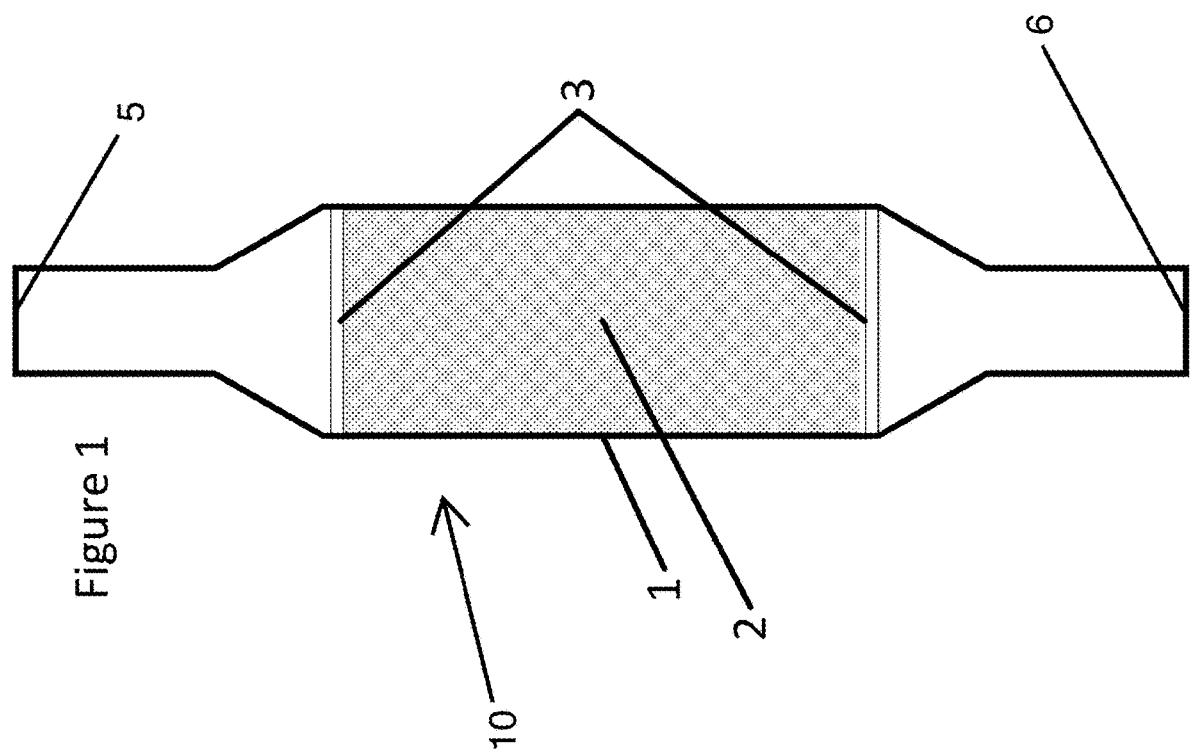
FIG. 1 is a line drawing evidencing a filter as used in the inventive process.

The disclosed filter composition and associated method addresses the problem of sulfur, PFAS, halogens, and other contaminants contained in fluids, and noxious nitrous oxides in feed and exhaust gases, by providing a means and method for removing such contaminants. For the purposes hereof, the word "fluid" will mean both gases and liquids. These contaminants in fluids can rapidly degrade and damage the performance of specialized catalysts and instrumentation, make well water smell and taste bad, and contaminants in exhaust gases are harmful to human health and to the environment. Independent studies demonstrate that sulfur-containing compounds contained in hydrogen and other fuel and feed gases can be reduced to levels that are undetectable by sophisticated instrumentation.

An inventive method to purify a gas stream consisting of hydrogen, natural gas, biogas, or other gasses, or a fluid stream of an organic or inorganic liquid must involve removing hydrogen sulfide, organosulfur compounds, PFAS, halogens, and other noxious impurities such as nitrous oxides from gas streams to the lowest concentration possible by passing the stream through a filter housing, wherein such housing is packed with a filtering medium comprising a composition of granular particles ranging in size from about 15 mm down to about 0.01 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium plus traces of elemental gold, palladium, and platinum. In a primary embodiment, the elemental gold, palladium, and platinum only collectively comprise between 0.000001% and 0.002% of the filtering medium.

The distribution of sizes of the particles within the filter housing is dependent on the diameter of the housing, the flow rate, the gas pressure, and the permitted pressure drop passing through the filter.

Very small housings of the laboratory type would contain only very small particles ranging from about 10 to about 150 microns while a large industrial type filter housing would typically contain particles ranging from about 50 microns up to about 5 mm or more.

Copper is the principle metallic component of the granular filtering medium thus, in one embodiment of the inventive filtering medium, the oxides of copper comprise up to approximately 90% of the composition by total weight. In another embodiment, copper oxides may comprise as little as 80% as determined by either total weight or ICP-MS solution analysis of nitric acid digestions of the medium. However, due to the presence of the non-copper metal oxides and the three metals in the composition, the composition does not behave like pure copper oxide, which would react to become copper metal and $H_2O$ in the presence of hydrogen, natural gas, or biogas. The other metallic oxides can be as much as 20% of the composition. The three elemental metals of gold, palladium and platinum are present in very small amounts, only up to about 0.002%, for example.

The filtering medium composition is created as a homogenous mixture with a broad range of grain sizes to reduce potential open spaces and, thus, media bypass during the filtering process. Once the medium is created and mixed to ensure uniformity, it is then inserted into the filter housing.

To create the inventive granular filtering medium, a solution containing the soluble compounds of copper with the other metals in proportions of total weight ranging from 0.0001% up to 1% is contacted with a 20% solution of sodium hydroxide in water to form a homogeneous precipitate of hydroxides of the metals which are then dried and heated to drive off the water of hydration. This process produces a mass of homogeneous solid material that is then broken into irregular granules with a jaw crusher followed by sorting the broken sizes with a rotary screening machine comprising a connected series of rotary sieves arranged as a column. In a preferred embodiment, the column comprises two sieves. The very fine particles pass all the way through the column of sieves and are used for the very small diameter filters, or are aglomerated into semi-spherical pieces, the particles that pass through the upper sieve but not through the bottom sieve are used in the medium diameter sized filters, and the largest particles that do not go through the upper sieve are used for large filter housings or are recycled back to the crusher for additional size reduction. With this arrangement, a broad but a controlled range of particles are available for packing the filter housing. The result is that little to none of the particles are wasted.

In a preferred embodiment, the housing of the filter will be cylindrical, made of materials resistant to attack from the fluid being filtered, and the filtering medium will be contained within the housing to prevent migration of the medium past the filter.

The filter housing can be composed of anything that will resist the pressure, temperature, and attack of the fluid being filtered, such as stainless steel, aluminum, other known corrosion resistant alloys, carbon fiber, compositions such as plastic or fiberglass when operated at suitable low temperatures and pressures, and so on.

The disclosed filter will be embodied to filter hot oxygen free gases, allowing filtration of any oxygen free gas between ambient air temperature up to about 500C, or gases containing oxygen at temperatures between ambient up to about 120C, or liquids without losing efficiency or degrading the filtering medium composition of granular particles.

The medium within the filter housing can be recycled, regenerated, or disposed of depending on the use of the filter. The useful lifetime of the filter is dependent upon the concentration of the contaminant in the fluid stream being filtered. The filtering medium will typically increase in weight by about 20% due to the sulfur and other impurities it has trapped. A filter housing containing 1,000 grams of filtering medium can absorb approximately 400 grams of H2S or more, which is the equivalent of approximately 300,000,000 Liters of 1 ppm H2S at atmospheric pressure and ambient temperature.

In a preferred embodiment, the housing will have a diameter of three or more times the diameter of the input line to spread and slow the flow through the filtering medium to decrease the pressure drop created by the resistance of the flow through the medium, and have a length of three or more times its own diameter to insure adequate contact between the fluid being filtered and the filtering medium. Also preferably, the filter housing will be arranged such that the feed will flow upward within the body of the housing in order to prevent packing of the filter medium that would increase the pressure drop within the housing.

Laboratory testing of the inventive filter has consistently yielded positive results. In a first lab test, 108 ppb of H2S contained in a 99.99% hydrogen sample was reduced to below 6 ppb, the limit of detection, by passing the gas through the inventive filter. In another lab test, 1.902 ppm H2S passed through the inventive filter and yielded a concentration of H2S below the limit of detection of 200 ppt. In a third test, both low and high concentrations of H2S, carbonyl sulfide, dimethyl disulfide, methyl mercaptan, and thiopene were passed through the inventive filter and testing of the filtered gas could not detect any of these sulfur containing compounds.

DETAILED DESCRIPTION OF THE FIGURES

Turning now to the figures, FIG. 1 shows the inventive filter 10, comprising filter housing 1, within which are centered two sintered filter discs 3, with filtering medium 2 contained between the two sintered discs. The filter is connected to an input line (not pictured) and, in a preferred embodiment, flow upward through the filter medium, such that inlet 4 is located on the lower aspect of the filter, while the outlet 5 is located on the upper aspect of the filter.

Figure 2:
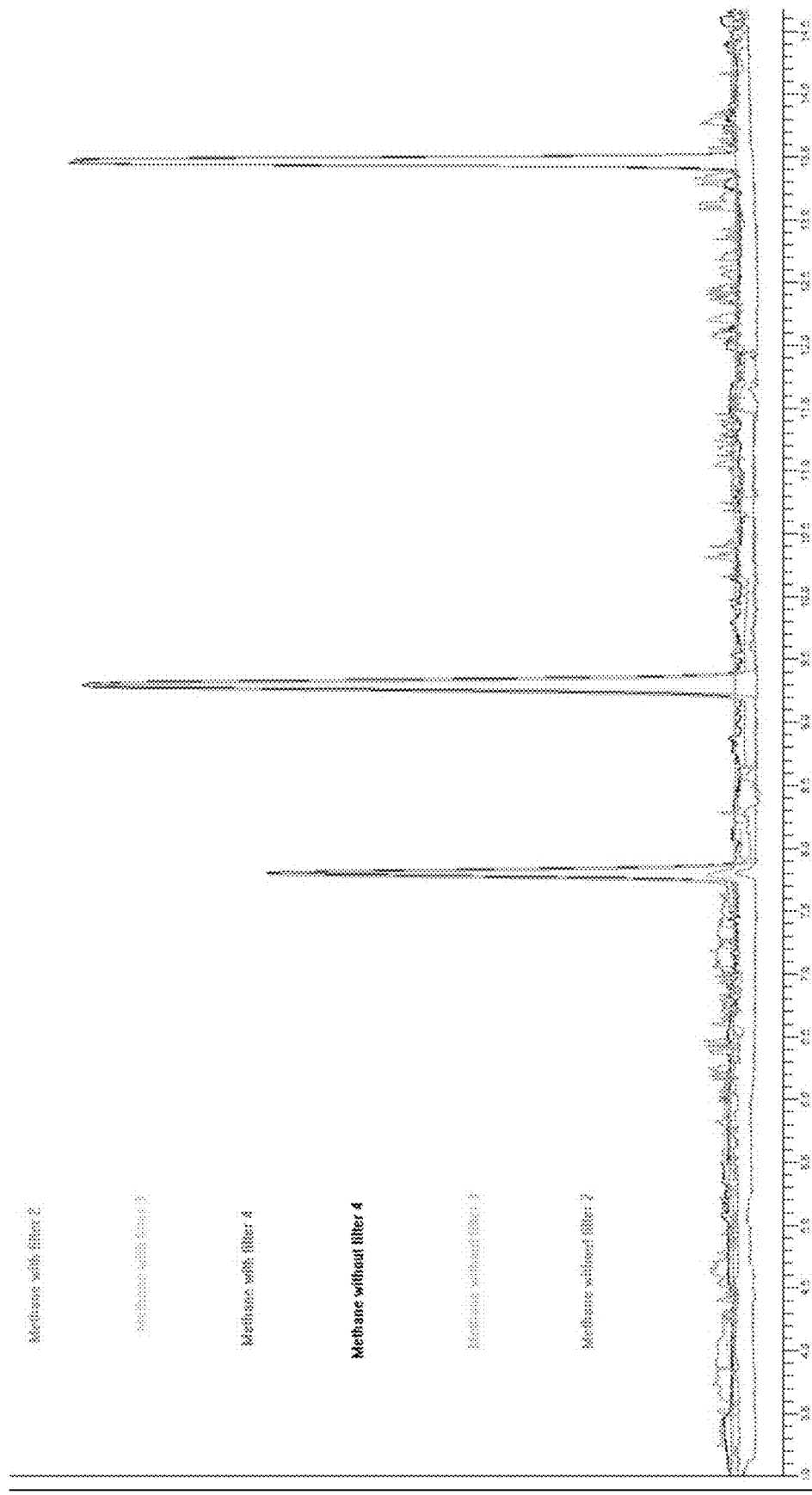
FIG. 2 is a graph evidencing results of the inventive filter in a natural gas flow.

FIG. 2 is a chart showing the composite gas chromatograms of six different samples of methane containing known concentrations of three different odiferous sulfur containing hydrocarbons commonly used as odorants in natural gas. The chemicals are dimethyl sulfide at 51.4 ppm, tert-butyl mercaptan at 103 ppm, and tetrahydrothiopene at 103 ppm. The three tallest peaks demonstrate that the three runs coinside perfectly with each other and down below we see the same three odorants have been reduced to trace amounts.

Although the process of the invention may be performed in any apparatus or system capable of and suitable for performing each of the steps of the process as described herein, the process is preferably performed utilizing the preferred embodiments of the system as described herein. Accordingly, the terminology as used and defined in relation to one process and system is equally applicable with respect to another process and system.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

LIST OF REFERENCE NUMBERS

1 Filter housing
2 Filtering medium
3 Sintered discs
4 Fluid inlet
5 Fluid outlet
10 Fluid filter The references recited herein are incorporated herein in their entirety, particularly as they relate to teaching the level of ordinary skill in this art and for any disclosure necessary for the more common understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A fluid filter for attachment to a gas or liquid line, such fluid filter comprising a housing packed with a filtering medium composition of granular particles ranging in size from about 15 mm to about 0.001 mm and consisting of a homogeneous composition of oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium, further comprising elemental gold, palladium, and platinum collectively comprising between 0.000001% and 0.002% of the filtering medium composition.

2. The fluid filter of claim 1, further comprising an input line, wherein the housing has a diameter three or more times larger than the input line diameter.

3. The fluid filter of claim 1, wherein the housing is three or more times longer than its own diameter.

4. The fluid filter of claim 1, wherein the granular particles range in size from 4 mm to 0.04 mm.

5. The fluid filter of claim 1, wherein the filtering medium composition is at least 80% oxides of copper as determined by ICP-MS solution analysis of nitric acid digestions of the medium.

6. The fluid filter of claim 1, wherein the filtering medium composition is comprised of at least 90% by total weight oxides of copper.

7. The fluid filter of claim 1, further comprising a contact temperature range from ambient temperature up to 500 C.

8. The fluid filter of claim 7, wherein the contact temperature ranges from 30 C to 300 C.

9. The fluid filter of claim 1, wherein the composition of the filtering medium composition is recyclable or regenerable.

10. A filtering medium composition of granular particles ranging in size from about 15 mm down to about 0.001 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium plus elemental gold, palladium, and platinum, wherein percentages of components are given by total weight and:

oxides of copper comprise at least 80% of the filtering medium composition, non-copper oxides comprise between 0.001% and 19.9999% of the filtering medium composition, and elemental gold, palladium and platinum comprise between 0.000001% and 0.002% of the filtering medium composition.

11. The filtering medium of claim 10, wherein:

oxides of copper comprise up to 90% of the filtering medium composition, non-copper oxides comprise between 0.001% and 9.9999% of the filtering medium composition, and elemental gold, palladium and platinum comprise between 0.00001% and 0.0001% of the filtering medium composition.

12. A process for removing hydrogen sulfide, sulfur containing compounds such as thiols or mercaptans, oxides of nitrogen, PFAS substances and halogens from a gas or liquid stream that lowers the concentration of these contaminants to levels that are below the limit of detection of standard laboratory instrumentation by passing the gas or liquid stream through a fluid filter, such filter comprising a filter housing with a contact temperature ranging from about ambient to about 500 C that is packed with a filtering medium composition of granular particles ranging in size from about 15 mm down to about 0.01 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium, further comprising elemental gold, palladium, and platinum collectively comprising between 0.000001% and 0.002% of the filtering medium composition.

13. The process of claim 12, wherein the stream flows upward through the filter.

14. The process of claim 12, wherein the filtering medium composition is comprised of granular particles ranging in size from about 15 mm down to about 0.001 mm and consisting of a homogeneous composition of the oxides of aluminum, antimony, barium, beryllium, bismuth, boron, cadmium, calcium, cerium, cesium, chromium, cobalt, copper, dysprosium, erbium, europium, gadolinium, gallium, germanium, hafnium, holmium, indium, iron, lanthanum, lead, lithium, lutetium, magnesium, manganese, molybdenum, neodymium, nickel, praseodymium, rhenium, rhodium, samarium, silicon, silver, strontium, titanium, vanadium, ytterbium, yttrium, zinc and zirconium plus elemental gold, palladium, and platinum, wherein percentages of components are given by total weight and:

oxides of copper comprise at least 80% of the filtering medium composition, non-copper oxides comprise between 0.001% and 19.9999% of the filtering medium composition, and elemental gold, palladium and platinum comprise between 0.000001% and 0.002% of the filtering medium composition.

15. The process of claim 12, wherein the stream is comprised of hydrogen, natural gas, biogas, or other laboratory or industrial gases or mixture of gases comprising air and specialty high purity composite gases of the grade known as "Chemically Pure" or "Research" that are bottled gases typically available to laboratory and industrial customers, in pipelines, in exhaust streams, or of liquids such as organic or inorganic liquids.

16. The process of claim 12, wherein hydrogen sulfide, thiols, mercaptans, other sulfur containing molecules, oxides of nitrogen, PFAS substances and halogens are removed from feed or exhaust fluids.

* * * * *